United States Patent
Carlill et al.

(10) Patent No.: US 9,261,106 B2
(45) Date of Patent: Feb. 16, 2016

(54) SYSTEM FOR REDUCING COMPRESSOR OIL CONSUMPTION

(75) Inventors: Tom W. Carlill, Peterborough (GB); Ian Pink, Malmesbury (GB)

(73) Assignee: Perkins Engines Company Limited, Peterborough (GB)

( * ) Notice: Subject to any disclaimer, the term of this patent is extended or adjusted under 35 U.S.C. 154(b) by 876 days.

(21) Appl. No.: 13/516,349

(22) PCT Filed: Dec. 15, 2010

(86) PCT No.: PCT/GB2010/002275
§ 371 (c)(1),
(2), (4) Date: Oct. 9, 2012

(87) PCT Pub. No.: WO2011/073620
PCT Pub. Date: Jun. 23, 2011

(65) Prior Publication Data
US 2013/0022445 A1  Jan. 24, 2013

(30) Foreign Application Priority Data
Dec. 15, 2009  (EP) ..................... 09252792

(51) Int. Cl.
| F04D 29/10 | (2006.01) |
| F01D 25/18 | (2006.01) |
| F02B 37/00 | (2006.01) |
| F02B 37/013 | (2006.01) |
| F02B 37/16 | (2006.01) |
| F02C 6/12 | (2006.01) |

(52) U.S. Cl.
CPC ............ *F04D 29/104* (2013.01); *F01D 25/183* (2013.01); *F02B 37/004* (2013.01); *F02B 37/013* (2013.01); *F02B 37/16* (2013.01); *F02C 6/12* (2013.01); *F05D 2220/40* (2013.01); *F05D 2240/55* (2013.01); *Y02T 10/144* (2013.01)

(58) Field of Classification Search
CPC ....... F04D 1/10; F04D 15/0072; F04D 17/14; F04D 27/0269; F04D 27/005; F04D 29/10; F04D 29/102; F04D 29/104; F01D 11/04; F01D 11/06; F01D 11/025; F01D 11/02
See application file for complete search history.

(56) References Cited

U.S. PATENT DOCUMENTS

| 6,368,077 | B1 | 4/2002 | Meyerkord et al. |
| 6,460,519 | B1 * | 10/2002 | Pierpont .................. 123/568.12 |
| 7,287,384 | B2 | 10/2007 | Fish et al. |
| 8,123,501 | B2 * | 2/2012 | Gomilar et al. ............... 417/407 |
| 8,387,385 | B2 * | 3/2013 | Gray et al. ...................... 60/612 |

FOREIGN PATENT DOCUMENTS

| CN | 101260827 A | 9/2008 |
| JP | 1982158940 | 3/1982 |
| JP | 57-158940 U | 10/1982 |
| JP | 58093932 A | 6/1983 |
| JP | 63-016134 A | 1/1988 |
| JP | 02-082213 U | 6/1990 |

(Continued)

*Primary Examiner* — Edward Look
*Assistant Examiner* — Christopher J Hargitt

(57) ABSTRACT

An air induction system for a power source including a first compressor and a second compressor is disclosed. The air induction system includes an air feed passageway that directs compressed air from the second compressor to an area between a compressor wheel and a center housing in the first compressor to reduce oil consumption in the first compressor.

17 Claims, 2 Drawing Sheets

(56) References Cited

FOREIGN PATENT DOCUMENTS

| JP | 02-085830 U | 7/1990 |
|----|----|----|
| JP | 1990085830 | 7/1990 |
| JP | 04-040133 U | 4/1992 |
| JP | 2000-002192 A | 1/2000 |
| KR | 2004037773 A | 10/2007 |
| WO | 2006005355 | 1/2006 |
| WO | 2006005355 A1 | 1/2006 |
| WO | 2007/061339 A1 | 5/2007 |

* cited by examiner

SYSTEM FOR REDUCING COMPRESSOR OIL CONSUMPTION

CROSS-REFERENCE TO RELATED APPLICATIONS

This application is a 35 USC §371 U.S. national stage filing of International Patent Application No. PCT/GB2010/002275 filed on Dec. 15, 2010, which claims priority under the Paris Convention and 35 USC §119 to European Patent Application No. 09252792.8, filed on Dec. 15, 2009.

FIELD OF THE DISCLOSURE

The present disclosure is directed to an air induction system for an engine. More particularly, the present disclosure is directed to an air induction system utilizing high pressure air to reduce compressor oil consumption.

BACKGROUND OF THE DISCLOSURE

Internal combustion engines may be equipped with a turbocharged air induction system to improve the power output generated by the engine. The turbocharged air induction system increases engine power by forcing more air into the combustion chambers than would otherwise be possible. This increased amount of air allows for enhanced fueling that further increases the power output generated by the engine.

Turbochargers typically mount a turbine wheel and a compressor wheel onto a rotatable shaft. The shaft is typically rotationally supported within a housing by bearings that are lubricated by engine oil. Shaft seals are employed at both the compressor and turbine ends of the housing to prevent the high pressure gases from entering the housing (and then into the engine crankcase) as well as to prevent oil entering the compressor and turbine areas.

Even with shaft seals, under some conditions, oil can leak into the compressor area and get carried into the engine intake. To prevent or reduce the likelihood of oil leaking by the shaft seals, some manufacturers direct compressed air from the compressor to the seal area.

U.S. Pat. No. 6,368,077 to Meyerkord et al. ("the '077 patent"), for example, discloses a seal system from a four cycle engine turbocharger. The turbocharger includes a turbine wheel and a compressor wheel mounted on an oil-lubricated rotor shaft. Labyrinth seals at both the compressor and turbine end of the shaft are employed to limit oil leakage into the turbine area and the compressor area. In addition, air pressure from the output of the compressor wheel is conducted through internal passages in the bearing housing to the labyrinth seals to further prevent the passage of oil toward the compressor and turbine wheels.

Though the system in the '077 patent may help limit oil leaking into the compressor area, the multiple internal air passages add complexity to the system and the air pressure directed into the seals is unregulated and limited to the output pressure of the compressor.

The disclosed exhaust system is directed to overcoming one or more of the problems set forth above and/or other problems of the prior art.

SUMMARY OF THE DISCLOSURE

In one aspect, the disclosure is directed toward an air induction system for a power source including a first compressor and a second compressor. A passageway directs compressed air from the second compressor to an area between a compressor wheel and a center housing. The second compressor may be configured to compress air to a higher pressure than the first compressor.

In another aspect, the disclosure is directed toward a method for reducing oil seal leakage in a first compressor having a compressor wheel and a back plate. The method including compressing air at a first location, compressing air at a second location; and directing compressed air from the second location to the area between the compressor wheel and a center housing.

BRIEF DESCRIPTION OF THE DRAWINGS

In the accompanying drawings, which are incorporated in and constitute a part of this specification, exemplary embodiments of the disclosure are illustrated, which, together with the written description, serve to explain the principles of the disclosed system.

DETAILED DESCRIPTION OF THE DISCLOSURE

Figure 1:
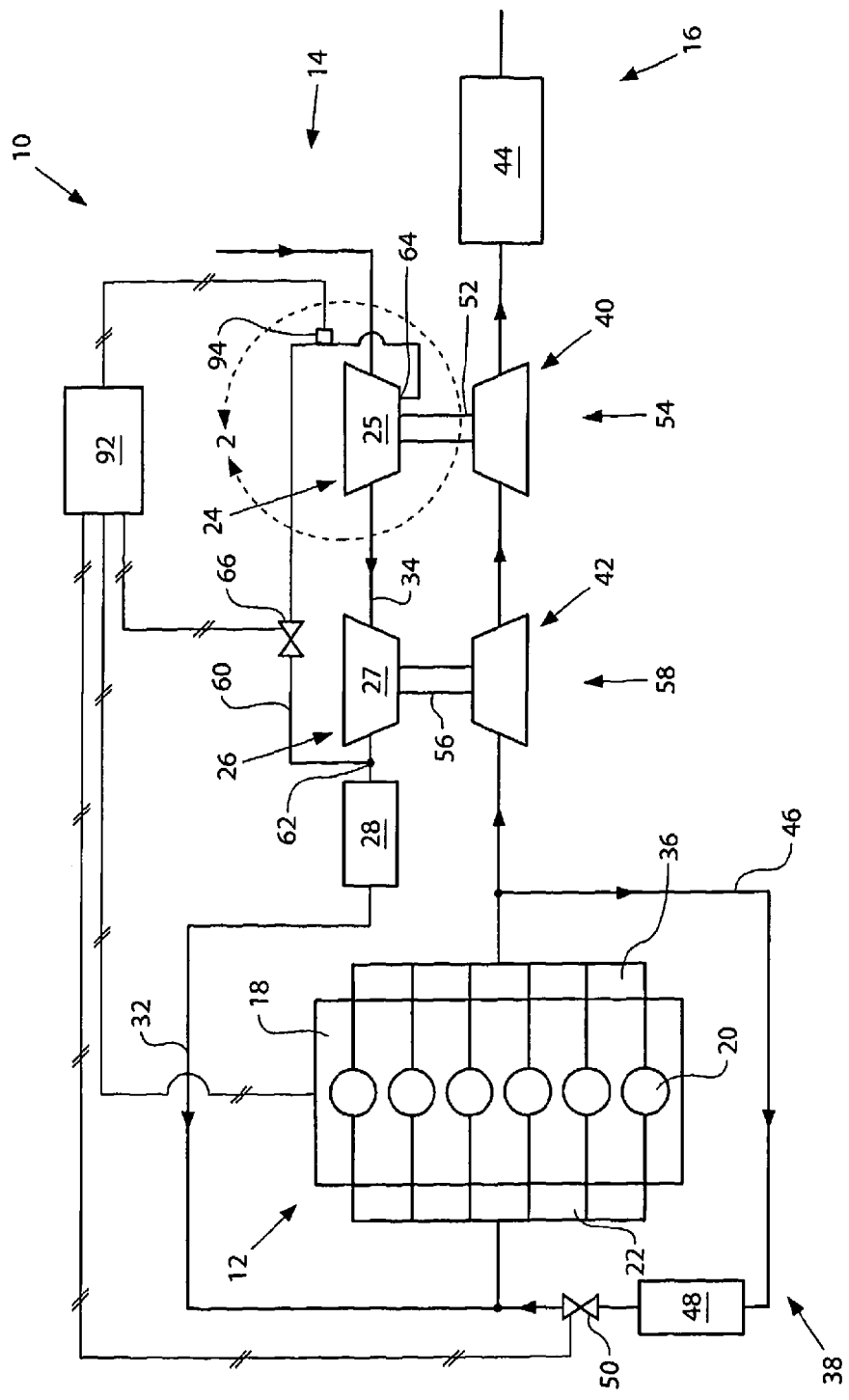
FIG. 1 is a schematic illustration of an embodiment of a disclosed power system.

FIG. 1 illustrates a power system 10 having a power source 12, an air induction system 14, and an exhaust system 16. For the purposes of this disclosure, the power source 12 is depicted and described as a four-stroke diesel engine. One skilled in the art will recognize, however, that the power source 12 may be any other type of combustion engine such as, for example, a gasoline or a gaseous fuel-powered engine. The power source 12 includes an engine block 18 that at least partially defines a plurality of cylinders 20. A piston (not shown) is slidably disposed within each cylinder 20 to reciprocate between a top-dead-center position and a bottom-dead-center position, and a cylinder head (not shown) is associated with each cylinder 20. In the illustrated embodiment, the power source 12 includes six cylinders 20. It is contemplated, however, that the power source 12 may include a greater or lesser number of cylinders 20 and that the cylinders 20 may be disposed in an "in-line" configuration, a "V" configuration, or in any other suitable configuration.

The air induction system 14 includes components configured to introduce charged air into power source 12. For example, air induction system 14 includes an intake manifold 22 in communication with the cylinders 20, a first compressor 24 having a first compressor wheel 25, a second compressor 26 having a second compressor wheel 27, and an air cooler 28. The first compressor 24 and the second compressor 26 may embody a fixed geometry compressor, a variable geometry compressor, or any other type of compressor configured to receive air from a fluid passageway upstream of the compressors 24, 26 and compress the air to an elevated pressure level before it enters the power source 12. The first compressor 24 and the second compressor 26 may be disposed in a series relationship and connected to power source 12 via a fluid passageway 32. In other embodiments, however, the second compressor 26 may be arranged in parallel with the first compressor 24.

The second compressor 26 is configured to compress air to a higher pressure than the first compressor 24. The second compressor 26 may be in fluid communication with the first compressor 24 via a fluid passageway 34 and arranged to receive compressed air from the first compressor 24 and further compress the air previously compressed by the first compressor 24.

The air cooler 28 may embody an air-to-air heat exchanger, an air-to-liquid heat exchanger, or a combination of both, and be configured to facilitate the transfer of thermal energy to or from the compressed air directed into power source 12. The air cooler 28 may be disposed within the fluid passageway 34 between the first compressor 24 and the second compressor 26 or within fluid passageway 32 between the power source 12 and the second compressor 26.

Exhaust system 16 includes components configured to direct exhaust from the power source 12 to the atmosphere. Specifically, exhaust system 16 includes an exhaust manifold 36 in communication with the cylinders 20, an exhaust gas recirculation (EGR) circuit 38 fluidly communicating the exhaust system 16 with the air induction system 14, a first turbine 40 associated with the first compressor 24, and a second turbine 42 associated with the second compressor 26, and an exhaust aftertreatment system 44 configured to remove undesirable emissions from the exhaust of the power source 12. The exhaust aftertreatment system 44 may include a variety of emissions treatment technology, including, but not limited to, regeneration devices, heat sources, oxidation catalysts, diesel oxidation catalysts (DOCs), diesel particulate filters (DPFs), selective catalytic reduction catalysts (SCRs), lean NOx traps (LNTs), mufflers, or other devices needed to treat the exhaust exiting the power source 12. In FIG. 1, the exhaust aftertreatment system 44 is illustrated as being downstream from the first turbine 40. One or more components of the exhaust aftertreatment system 44, however, may be located between the engine and the second turbine 42 and/or between the second turbine 42 and the first turbine 40.

The exhaust produced by the power source 12 enters the exhaust system 16 via the exhaust manifold 36. The exhaust manifold 36 fluidly connects the power source 12 to the first turbine 40 and the second turbine 42. The EGR circuit 38 may include components that cooperate to redirect a portion of the exhaust produced by the power source 12 from the exhaust manifold 36 to air induction system 14. Specifically, the EGR circuit 38 includes a fluid passageway 46, an EGR cooler 48, and a recirculation control valve 50. The fluid passageway 46 fluidly connects to the exhaust system 16 upstream of second turbine 42 and fluidly connects to the air induction system 14 downstream of the air cooler 28.

The recirculation control valve 50 is disposed within fluid passageway 46 downstream of the EGR cooler 48 to control the flow of exhaust through the EGR circuit 38. Recirculation control valve 50 may be any type of valve known in the art such as, for example, a butterfly valve, a diaphragm valve, a gate valve, a ball valve, a poppet valve, or a globe valve. In addition, recirculation control valve 50 may be solenoid-actuated, hydraulically-actuated, pneumatically-actuated or actuated in any other manner to selectively restrict or completely block the flow of exhaust through the fluid passageway 46.

The EGR cooler 48 is configured to cool exhaust flowing through EGR circuit 38. EGR cooler 48 may include a liquid-to-air heat exchanger, an air-to-air heat exchanger, or any other type of heat exchanger known in the art for cooling an exhaust flow.

The first turbine 40 may be configured to drive the first compressor 24 and the second turbine 42 may be configured to drive the second compressor 26. For example, first turbine 40 may be directly and mechanically connected to the first compressor 24 by way of a first shaft 52 to form a first turbocharger 54. As the hot exhaust gases exiting the power source 12 move through the first turbine 40, the first turbine 40 rotates and drives the first compressor 24 to pressurize the inlet air. The second turbine 42 may be similarly connected to the second compressor 26 via a second shaft 56 to form a second turbocharger 58. The second turbine 42 may be arranged in series with the first turbine 40. In another embodiment, the first turbine 40 is configured to drive both the first compressor 24 and the second compressor 26. For example, the power system 10 may include a twin compressor turbocharger (not shown) in which both the first compressor 24 and the second compressor 26 are mechanically connected to the first turbine 40 via a common shaft. In this embodiment, the second turbine 42 may be omitted.

The air induction system 14 also includes an air feed passageway 60 configured to route compressed air from second compressor wheel 27 to the first compressor 24. The air feed passageway 60 has an inlet 62, an outlet 64, and a pressure regulating device such as an air feed control device 66. The inlet 62 is located downstream of the second compressor wheel 27 and configured to receive air compressed by the second compressor 26. The outlet 64 is located proximate to the first compressor wheel 25. The air feed control device 66 may be configured in a variety of ways. Any device capable of controlling or regulating the flow rate and/or the pressure of the air directed to the first compressor 24 may be used. For example, the air feed control device 66 may be a pressure regulator capable of controlling the air pressure directed toward the first compressor 24 to between about 4 kPa and about 100 kPa. The air feed control device 66 may be, for example, electrically, pneumatically or mechanically actuated. The air feed control device 66 may also be configured to block air feed passageway 60 if the air pressure in the passageway exceeds a predetermined pressure threshold, such as 100 kPa for example.

Figure 2:
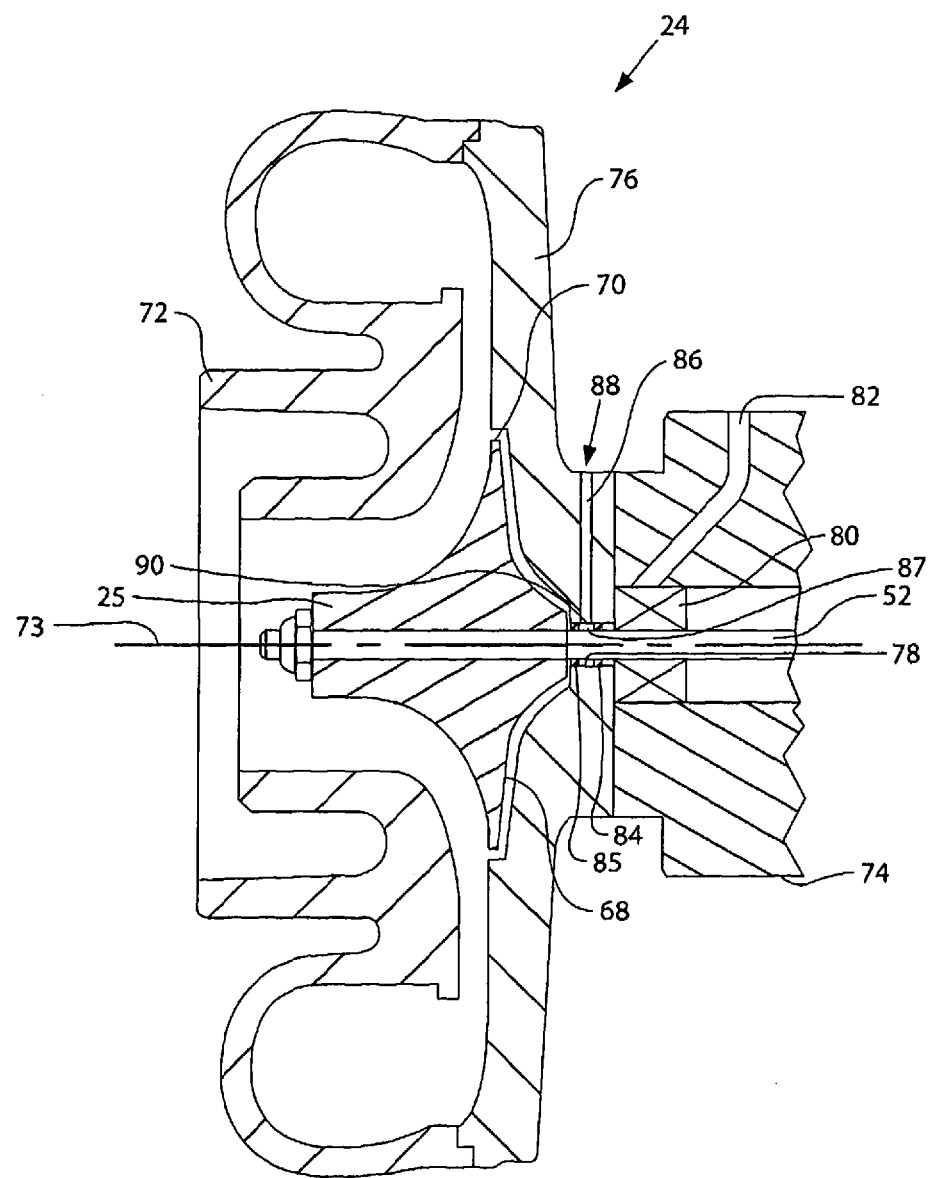
FIG. 2 is a side cross-sectional illustration of the compressor region of a turbocharger that may be used with the power system of FIG. 1.

Referring to FIG. 2, in the depicted embodiment, the first compressor wheel 25 includes a compressor wheel back face 68 and an outer circumferential edge 70. The first compressor wheel 25 is fixedly connected to the first shaft 52 and centrally disposed within a compressor housing 72 to rotate about a longitudinal axis 73. The compressor housing 72 may be configured to at least partially enclose the first compressor wheel 25.

The compressor housing 72 mounts onto a center housing 74 via a compressor back plate 76. In the depicted embodiment, the compressor back plate 76 is attached to both the compressor housing 72 and the center housing 74 by any suitable means, such as for example, fasteners. In other embodiments, the compressor back plate 76 may be formed integrally with the compressor housing 72 or the center housing 74.

The compressor back plate 76 forms an aperture 78 through which the first shaft 52 is received. The first shaft 52 is rotatably supported in the center housing 74 by one or more bearing assemblies 80. The bearing assemblies 80 may be configured in a variety of ways. Any bearing assembly 80 suitable of rotatably supporting the first shaft 52 within the center housing 74 at operating conditions and rotation speeds typical for turbocharger shafts may be used.

For example, it is known to use floating sleeve-type bearings on turbocharger shafts. Floating sleeve-type bearings (L e. journal bearings) utilize a sleeve (not shown) arranged between the turbocharger shaft and the center housing. Oil, such as from the oil circuit of an engine, is directed to the bearing assembly to form a thin film of oil between the turbocharger shaft and the sleeve and between the center housing and the sleeve. Thus, the sleeve "floats" between two films of oil and can rotate relative to the turbocharger shaft and the center housing.

Turbochargers are also known to use ball bearings. Similar to a floating sleeve-type bearing, the ball bearing assembly rotatably supports the turbocharger shaft within the center housing. Instead of the turbocharger shaft spinning on a cushion of oil with the sleeve bearings, however, with ball bearings, the shaft spins an inner race (not shown) of the ball bearing assembly.

The bearing assemblies 80 are oil-lubricated. An oil passage 82 is configured to provide oil, under pressure, to the bearing assemblies 80. For example, in the depicted embodiment, the oil passage 82 is formed in the center housing 74 and fluidly couples the bearing assembly 80 to a source of oil, such as the lubrication system (not shown) of the power source 12.

One or more shaft seals are utilized to prevent oil from the bearing assembly 80 entering the compressor area. The shaft seal(s) may be configured in a variety of ways. Any sealing device capable of resisting oil entering the compressor area may be used. In the depicted embodiment, an annular first seal 84 is disposed around the first shaft 52 between the center housing 74 and the first compressor wheel 25 and an annular second seal 85 is disposed around the first shaft 52 between the center housing 74 and the annular first seal 84. The annular first seal 84 and the annular second seal 85 are spaced axially apart such that an annular space 87 is formed there between.

An air passage 86 is provided that fluidly couples the air feed passageway 60 to an area between the center housing 74 and the first compressor wheel 25. In one embodiment, the air passage 86 is a portion of the air feed passageway 60. The air passage 86 includes a passage inlet 88 configured to receive compressed air from the air feed passageway 60 and a passage outlet 90. In the depicted embodiment, the air passage 86 extends through the compressor back plate 76. In other embodiments, however, the air passage 86 may extend partially or entirely through other portions of the first turbocharger 54, such as the compressor housing 72 and/or the center housing 74. Thus, any configuration of the air passage 86 that allows compressed air from the second compressor 26 to be directed to the area between the center housing 74 and the first compressor wheel 25 may be used. In the depicted embodiment, the air passage 86 fluidly couples the air feed passageway 60 to the annular space 87.

Referring back to FIG. 1, the power system 10 includes a controller 92 capable of controlling the operation of a portion of or all of the power system 10. The controller 92 may embody a single or multiple microprocessors, field programmable gate arrays (FPGAs), digital signal processors (DSPs), etc. that include a means for controlling an operation of power system 10 in response to signals received from one or more sensors.

Numerous commercially available microprocessors can be configured to perform the functions of the controller 92. It should be appreciated that the controller 92 could readily embody a microprocessor separate from that controlling other non-exhaust related power system functions, or that the controller 92 could be integral with a general power system microprocessor and be capable of controlling numerous power system functions and modes of operation. If separate from a general power system microprocessor, the controller 92 may communicate with the general power system microprocessor via data links or other methods. Various other known circuits may be associated with the controller 92, including power supply circuitry, signal-conditioning circuitry, actuator driver circuitry (i.e., circuitry powering solenoids, motors, or piezo actuators), communication circuitry, and other appropriate circuitry.

In the depicted embodiment, the controller 92 is used to control the air feed control device 66 to regulate the flow rate and/or pressure of the air being directed from the second compressor 26 to the first compressor 24. For example, a pressure sensor 94 may be associated with the air feed passageway 60 to produce a signal indicative of the air pressure being directed from the second compressor 26 to the first compressor 24. The controller 92 may receive a signal from the pressure sensor 94 and adjust the air feed control device 66 to produce a desire air pressure.

In another embodiment, the air feed control device 66 may be configured to regulate or control the flow and pressure without input from controller 92. For example, the air feed control device 66 may include mechanical means, such as a biasing element or diaphragm that regulates air pressure.

The controller 92 may also be configured to control the recirculation control valve 50 to regulate the flow rate and/or pressure of the exhaust gas being directed to the air induction system 14.or Industrial Applicability The disclosed air induction system may be implemented into any power system application that utilizes first and second compressors in an air induction system. The disclosed air induction system provides for reduced oil consumption of the first compressor.

In the depicted embodiment, exhaust from the power source 12 is directed through the second turbine 42 and the first turbine 40, in series. In response, the second turbine 42 drives the second compressor 26 via the second shaft 56 and the first turbine 40 drives the first compressor 24 via the first shaft 52. The first compressor 24 compresses air in the air induction system 14 to a first pressure. The second compressor 26 compresses the air previously compressed by the first compressor 24 to a second pressure, greater than the first pressure.

A portion of the air compressed by the second compressor 26 is directed back to the first compressor to an area between first compressor wheel 25 and the center housing 74. Directing pressurized air to the area between the first compressor wheel 25 and the center housing 74 creates a pressure zone between the first compressor wheel 25 and the bearing assemblies 80 that is greater than the oil pressure utilized to lubricate the bearing assemblies 80. Thus, the pressure zone resists oil leaking past the first seal 84 and into the compressor housing 72. Since the air passage 86 extends through the compressor back plate 76 and/or through other portions of the first turbocharger 54, compressed air from the second compressor 26 is directed between the first seal 84 and the second seal 85. In addition, since the second compressor 26 compresses air to a greater pressure than the first compressor 24, the pressure between the first compressor wheel 25 and the compressor back plate 76 may be greater than can be supplied if the output of the first compressor 24 was used.

The air pressure and flow to the area between the first compressor wheel 25 and the center housing 74 may also be controlled by the controller 92 and/or the air feed control device 66. Thus, the pressure can be varied depending on the operating conditions of the power system 10 and can be maintained within a desired range over a broad range of operating conditions. Furthermore, the air flow can be discontinued if desired, such as when a pressure threshold is reached.

It will be apparent to those skilled in the art that various modifications and variations can be made to the disclosed exhaust system. Other embodiments will be apparent to those skilled in the art from consideration of the specification and practice of the disclosed exhaust system. It is intended that the specification and examples be considered as exemplary only, with a true scope being indicated by the following claims and their equivalents.

What is claimed is:

1. An air induction system, comprising:
a first compressor having a first compressor wheel mounted on a shaft supported in a center housing and an annular space formed between an annular first seal and an annular second seal, at least one surface of the annular space defined by the shaft;
a second compressor having a second compressor wheel;
a passageway configured to direct compressed air from an area downstream of the second compressor wheel to the area between the first compressor wheel and the center housing; and
a control device disposed in the passageway, the control device configured to control the flow and/or pressure of the compressed air in the passageway that is directed to the area between the first compressor wheel and the center housing.

2. The air induction system of claim 1 wherein the second compressor is arranged in series with the first compressor and is configured to compress air to a higher pressure than the first compressor.

3. The air induction system of claim 1 wherein the passageway directs compressed air through a passage in a back plate of the first compressor.

4. The air induction system of claim 1, wherein the annular first seal is disposed around the shaft between the center housing and the first compressor wheel and wherein the passageway is configured to direct compressed air to an area between the first compressor wheel and the annular first seal.

5. The air induction system of claim 4, wherein the annular second seal disposed around the shaft between the annular first seal and the first compressor wheel wherein the passageway is configured to direct compressed air to the annular space.

6. The air induction system of claim 1 wherein the control device is configured to close the passageway if the air pressure exceeds a predetermined pressure threshold.

7. A method for reducing oil seal leakage in a compressor having a compressor wheel mounted on a shaft supported in a center housing, comprising:
compressing air at a first location to a first pressure;
compressing air at a second location to a second pressure that is higher than the first pressure; and
directing air compressed at the second location to an annular space formed between an annular first seal and an annular second seal, at least one surface of the annular space defined by the shaft.

8. The method of claim 7 wherein directing compressed air from the second location to the area between the compressor wheel and the center housing further includes directing compressed air through a passage in a back plate of the compressor.

9. The method of claim 7 wherein compressing air at the first location further comprises compressing air with a first turbocharger and compressing air at the second location further comprises compressing air previously compressed by the first turbocharger with a second turbocharger.

10. The method of claim 7 further comprising regulating the pressure and/or flow of the compressed air directed from the second location to the first location.

11. A power system, comprising:
a first compressor having a first compressor wheel mounted on a shaft supported in a center housing;
a second compressor having a second compressor wheel;
a passageway configured to direct compressed air from an area downstream of the second compressor wheel to the area between the first compressor wheel and the center housing;
a controller configured to control an air feed control device, the air feed control device disposed in the passageway, the air feed control device configured to control the flow and/or pressure of the compressed air in the passageway that is directed to the area between the first compressor wheel and the center housing.

12. The power system of claim 11 wherein the controller is further configured to control a recirculation control valve, the recirculation control valve disposed in a fluid passageway configured to direct exhaust gas to an intake manifold, the recirculation control valve configured to control the flow of exhaust gas into the intake manifold.

13. The power system of claim 11 wherein the second compressor is arranged in series with the first compressor and is configured to compress air to a higher pressure than the first compressor.

14. The power system of claim 11 wherein the passageway directs compressed air through a passage in a back plate of the first compressor.

15. The power system of claim 11 further comprising an annular first seal disposed between the center housing and the first compressor wheel wherein the passageway is configured to direct compressed air to an area between the first compressor wheel and the annular first seal.

16. The power system of claim 15 further comprising an annular second seal disposed between the annular first seal and the first compressor wheel, wherein the passageway is configured to direct compressed air to an area between the annular first seal and the annular second seal.

17. The power system of claim 11 wherein the control device is further configured to close the passageway if the air pressure exceeds a predetermined pressure threshold.

* * * * *